UNITED STATES PATENT OFFICE.

GUSTAVE DOSSELMAN, OF CHICAGO, ILLINOIS, ASSIGNOR TO ADAMS AND ELTING COMPANY, OF CHICAGO, ILLINOIS, A CORPORATION OF ILLINOIS.

ONE-COAT SURFACE-FINISH.

No. 893,987.  Specification of Letters Patent.  Patented July 21, 1908.

Application filed January 2, 1904. Serial No. 187,554.

*To all whom it may concern:*

Be it known that I, GUSTAVE DOSSELMAN, a citizen of the United States, residing at Chicago, county of Cook, State of Illinois, have invented a certain new and useful Improvement in One-Coat Surface-Finishes, and declare the following to be a full, clear, and exact description of the same, such as will enable others skilled in the art to which it pertains to make and use the same.

My invention relates in general to compositions of matter for finishing surfaces, and more particularly to a composition a single coat of which will produce upon the surface treated the desired finish.

In order to impart to a surface such finishes as mahogany; Flemish, weathered oak, or golden oak, it has heretofore been customary to subject the surface to a series of treatments comprising, first, staining the surface the desired color, then scraping the surface, afterwards applying shellac and rubbing down the surface, and finally applying wax.

The primary object of my invention is to provide a composition of matter consisting in such ingredients that a single coat thereof applied to a surface will impart thereto the desired finish, thereby reducing the labor and expense incident to the numerous steps heretofore necessary to produce the finish.

A further object of my invention is to provide a composition of matter simple in manufacture, and inexpensive in cost, and which may be readily applied and produces an attractive and durable surface finish.

My invention, generally described, is a composition of matter consisting in a coloring ingredient, a solvent for the coloring ingredient, a body ingredient which serves as the principal coating on the finished surface, and an ingredient for uniting the coloring solution to the body ingredient. My improved composition may also contain an ingredient to retard the drying thereof so as to enable it to be smoothly spread over the treated surface.

In carrying out my invention I have found in practice that a composition of matter consisting in a pigment of the desired color dissolved in wood alcohol, amylacetate collodion, and shellac, when applied to a surface imparts thereto an attractive appearance and at the same time covers the same with a durable coating.

While any desired relative proportions of the ingredients may be used, I have found in practice that good results may be produced by compounding one part of shellac to two parts of amylacetate collodion and adding a solution of wood alcohol containing sufficient pigment to produce the desired shade of color.

In lieu of dissolving a pigment in methyl alcohol to impart the desired color any other form of coloring matter may be used, such as amylene or other organic or chemical colors. In lieu of the amylacetate collodion may be employed benzole and a vegetable gum, but I prefer to use the amylacetate collodion that is gun cotton dissolved in amylacetate rather than an equivalent ingredient such as suggested. The amylacetate collodion or its equivalent constitutes the body of the composition and serves when the finish has been applied to a surface, as the coating thereof, while the coloring solution gives to the coating the desired appearance. The shellac serves as a binder to unite the coloring solution to the amylacetate collodion. As an equivalent for shellac a gum may be used.

My improved composition of matter also preferably contains an ingredient to retard the drying thereof so as to enable the same to be smoothly spread upon the treated surface. Such ingredient is preferably glycerin, although any variety of wax may be used in lieu thereof. The amount of glycerin to be used should be varied according to the nature of the surface to be treated. If a large surface is to be finished more glycerin should be used in order that the composition may be smoothly spread thereon than is necessary when the surface to be treated is small.

My composition of matter may be manufactured by first dissolving the coloring matter in a solvent such as methyl alcohol into which the shellac is poured and thoroughly mixed. The amylacetate collodion is then added and agitated so as to thoroughly intermingle the ingredients. Glycerin or melted wax is finally added, if desired, to retard the drying of the composition. Other processes of compounding the composition may be followed but the foregoing has been found in practice to be preferable.

A single coat of a composition of matter comprising the ingredients above specified or their equivalents applied to a surface produces a finish thereon which is not injured by either steam or water, and which by incorporating therein suitable coloring matter may be made to resemble black or brown Flemish oak; mahogany; brown or gray weathered oak; golden oak; or colonial finish.

I do not of course wish to limit myself either to the particular ingredients specified, nor to the proportions of the ingredients, but desire to cover a composition of matter containing equivalents for the various specified ingredients and of any relative proportions which may be found suitable for the various different surfaces to which my invention may be applied.

Having now fully described my invention, what I claim as new, and desire to secure by Letters Patent, is—

1. A composition of matter for finishing surfaces containing a coloring solution, amylacetate collodion, an ingredient to unite the coloring solution to the amylacetate collodion, and glycerin.

2. A composition of matter for finishing surfaces containing pigment, methyl alcohol, amylacetate collodion, shellac, and glycerin.

In testimony whereof, I sign this specification in the presence of two witnesses.

GUSTAVE DOSSELMAN.

Witnesses:
 GEO. L. WILKINSON,
 C. C. CUNNINGHAM.